United States Patent Office 3,143,401
Patented Aug. 4, 1964

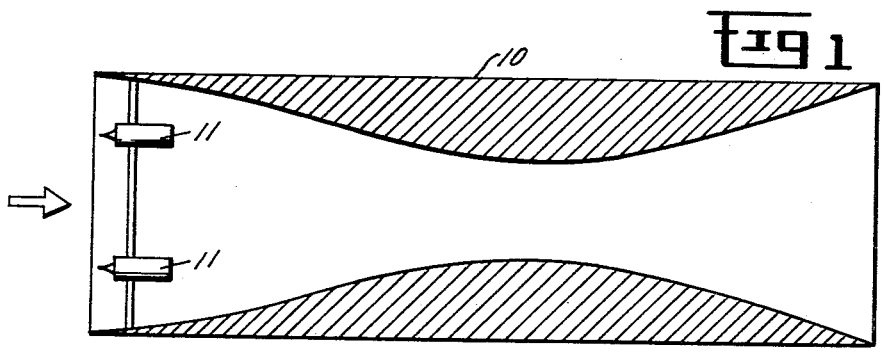
Fig 1
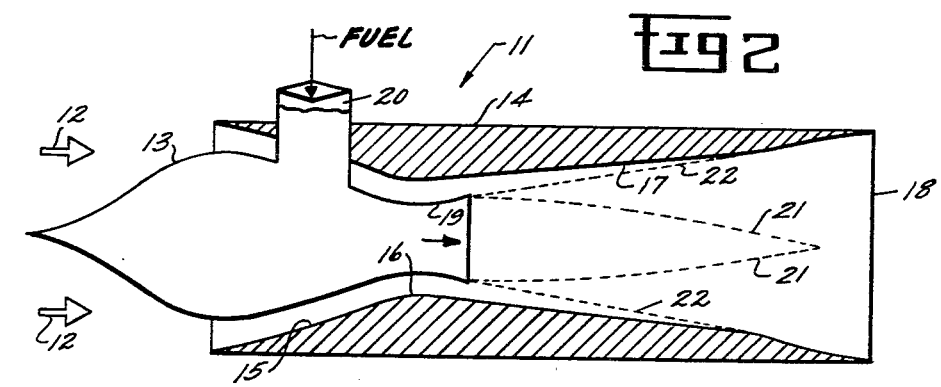
Fig 2
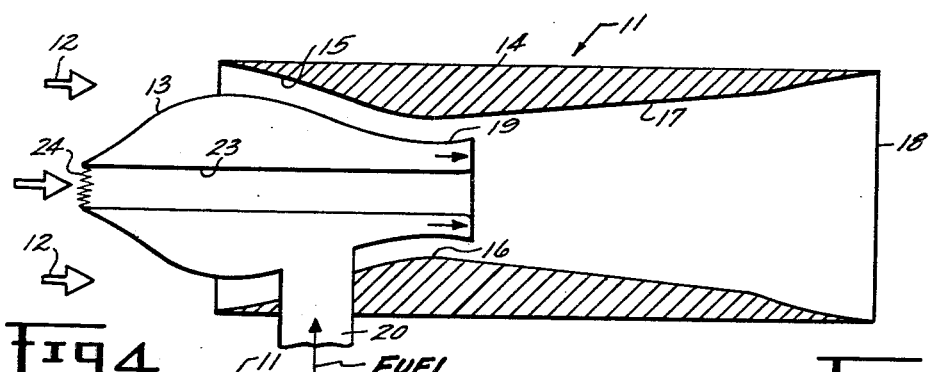
Fig 3
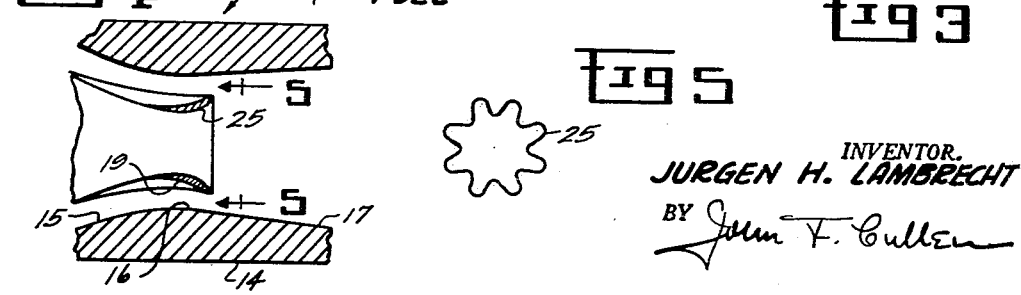
Fig 4
Fig 5
INVENTOR.
JURGEN H. LAMBRECHT
BY John F. Cullen
ATTORNEY—

3,143,401
SUPERSONIC FUEL INJECTOR
Jurgen Hans Lambrecht, Rancho Cordova, Calif., assignor to General Electric Company, a corporation of New York
Filed Aug. 17, 1961, Ser. No. 132,162
8 Claims. (Cl. 48—180)

This invention relates to a fuel injector and, more particularly, to a supersonic fuel injector for use in a supersonic airstream.

In high Mach number flight, which for purposes of this invention refers to Mach 6 and above, supersonic combustion in air breathing engines is desirable as contrasted to conventional subsonic combustion. If this can be obtained, the pressure recovery losses in the inlet diffuser and the losses due to incomplete recombination of the dissociated combustion products in the exhaust nozzle can be reduced, resulting in an improvement in specific fuel consumption of the engine.

For subsonic combustion systems the high Mach number inlet air is decelerated by shock waves (with their inherent losses) in a diffuser to subsonic velocity for the fuel injection and combustion to take place. For flight Mach numbers of 6 and above the pressure recovery in such a system is 30 percent or less, which means that more than 70 percent of the theoretically available pressure is lost in the form of heat and turbulence. For supersonic combustion systems the high Mach number inlet air is decelerated only to a supersonic velocity, resulting in a higher pressure recovery due to fewer shock losses since the shocking down process does not go as far. Since, in both cases, the exhaust nozzle pressure is converted into velocity, a loss in available pressure corresponds to a loss in exhaust velocity and, therefore, thrust and performance.

Furthermore, at high flight speeds deceleration of the inlet air to subsonic velocities creates high static temperatures at the combustor inlet and temperatures at the combustor outlet which are so high that dissociation of the exhaust gases is encountered, which also results in a substantial loss in performance. With supersonic combustion, temperatures in the combustor are kept lower due to less shocking down of the air, resulting in less dissociation and a more efficient thermodynamic process and improved specific fuel consumption of the engine.

The instant invention is primarily applicable to flight Mach number of six and above although it is not limited to this region. At these high velocities, aerodynamic heating is such a problem that liquid fuels are used for cooling parts of the aircraft or engine and are vaporized in the process so that the fuel injected is customarily vapor. However, for purposes of this invention, liquid fuel might also be used.

One of the problems encountered in injecting fuel into a supersonic air stream is that of mixing. Because of the high velocities at which the air and fuel are traveling, injection in the downstream direction results in slow mixing over a long axial length. Also, there is a momentum pressure loss due to the mixing process. Both of these objections are excessive if fuel is injected into air which is moving at supersonic velocity by conventional injectors. An alternate means is the injection of the fuel at right angles to the air stream which merely results in setting up undesirable shock waves since the jet of fuel is substantially like a solid rod sticking into the air stream. Thus, it is desirable to inject fuel into a supersonic stream with low pressure loss and still obtain adequate mixing.

The main object of the present invention is to provide a supersonic fuel injector for use in a supersonic air stream in which the fuel injection results in low pressure loss.

Another object is to provide such an injector that ensures good mixing of the fuel with the air over a shorter axial length than is possible with conventional fuel injectors.

Briefly stated, the injector herein disclosed has an upstream directd spike with a spaced outer tube concentric to and surrounding it. These are designed to form an external compression supersonic annular inlet. The outer tube has an internal venturi-like shape designed to prevent a normal shock. The spike is open at the downstream end substantially at or near the throat of the tube and fuel is piped to the interior of the spike under pressure. The opening at the lower end of the spike is sized such that a fuel rich mixture is generated in the downstream diverging portion of the tube. By fuel rich, it is meant that more fuel is present than is required for complete combustion. Mixing means on a diverging spike outlet are also provided.

While the specification concludes with claims particularly pointing out and distinctly claiming the subject matter which I regard as my invention, it is believed the invention will be better understood from the following description taken in connection with the accompanying drawing in which:

FIGURE 1 is a schematic outline of a supersonic engine illustrating a typical location of the injector of the instant invention;

FIGURE 2 is a schematic cross-section of a typical injector of the instant invention;

FIGURE 3 is a schematic cross-section of a modified form of the injector of the instant invention;

FIGURE 4 is a partial schematic of a mixer element on the spike outlet; and,

FIGURE 5 is a view taken on line 5—5 of FIGURE 4 illustrating the shape of a typical mixing element.

Referring first to FIGURE 1 there is shown a schematic arrangement of how the fuel injectors of this invention can be arranged in the inlet of a supersonic ramjet engine. Ramjet engine 10 is merely shown diagrammatically since such a concept is well known. The fuel injectors of the instant invention, generally designated at 11 may be disposed in the forward end of the ramjet inlet and across the inlet as diagrammatically shown. The number of injectors used will vary according to many factors not important herein for the understanding of the injector per se. The location of the injectors in the forward end provides a long axial mixing distance in the diffuser section for burning in the ramjet throat or combustor section. This is merely a typical illustration to illustrate the locale of the injectors in a typical supersonic engine. They may be used elsewhere and are not confined to the location nor powerplant just described.

Referring next to FIGURE 2 wherein a typical injector is shown, in order to capture some of the air in the supersonic air stream flowing in the direction of arrows 12, there is provided a forwardly or upstream directed spike 13 which is hollow for a purpose to be described. Cooperating with the spike for the capture of air is tube 14 which surrounds the spike and is concentrically spaced from it as shown. In order to slow the incoming air, tube 14 is a venturi-like member on its internal surface having a converging portion 15 which converges to a throat section 16 and then diverges along 17 to its downstream end 18. The design of spike 13 and tube 14 is such that they form an external compression supersonic annular inlet. This results in the capture of all the inlet air swept out by the area of the front of tube 14. The proper design of such an inlet to avoid normal shock and permit only weak oblique shock waves is well known since losses across oblique waves are lower, and no invention is made to this feature per se, except as it forms part of the overall combination. Thus, a small part of the large quantity of supersonic air 12 is captured by the inlet of the injector and this ear is decelerated as it is funneled through the converging portion 15 of tube 14. It is noted that the spike converges in this portion also to cooperate with the tube 14 to decelerate the air. It should be noted that the air passing through the converging portion 15 is still supersonic but at a lower velocity than the outside supersonic air 12. This is for the purpose of avoiding the large change from supersonic to subsonic and the resulting pressure losses previously mentioned.

Thus, the air is decelerated down to throat section 16 where it is still supersonic. The term "throat" is meant to convey merely the idea of a smaller cross-sectional area and does not mean Mach one flow and for this purpose, in order to generally define the configuration of tube 14, the term "venturi-like" is used in the specification and claims.

The inlet air, after passing the throat section 16 continues through the annulus at supersonic velocity out the diverging portion 17 and back into the main air stream 12. In order to inject fuel into the supersonic air stream substantially at or near the throat section, spike 13 has a downstream directed opening 19. Fuel is supplied by a line 20 to the interior of the spike under pressure from a source not shown sufficient to expel the fuel at the desired flow rate and velocity.

Since the momentum pressure loss due to the mixing process between the fuel and air is very strongly dependent on the Mach number of the air into which the fuel is injected, the air is decelerated in the manner described to reduce its Mach number and thus reduce the momentum pressure loss considerably. Since the air Mach number is smallest at or near the throat portion, this is where the fuel is injected. The fuel may be injected either sonically, subsonically or supersonically. If spike opening 19 is converging fuel injection may take place at sonic speed or subsonically. Preferably, in order to keep the momentum pressure loss as low as possible as described above, spike opening 19 will be converging-diverging as shown for supersonic fuel injection. However, in either case, the fuel is injected into the supersonic air stream in the annulus and is thus a supersonic fuel injector since the air stream forms part of the fuel injector structure. The supersonic injection of fuel is preferred in order that the supersonic air in the annulus does not have to accelerate the fuel up to the air speed which acceleration entails losses. Consequently, supersonic injection avoids the large momentum pressure loss previously mentioned. The size of opening 19 is such that in conjunction with the fuel supplied it always ensures a fuel rich mixture in the injector to promote proper mixing and allow for additional mixing downstream of the injector. It can also be seen that, within the boundary fuel lines 21 there is all fuel and, between the boundary air lines 22 and the inner wall of the diverging portion 17 of the tube there is all air. Where these lines cross, such as at the opening 19, mixing takes place so that it can be seen that mixing occurs throughout the diverging portion of the fuel injector.

In order to avoid drag created by the fuel injector itself, the inlet and exit areas of tube 14 may be made equal in cross-section thus making the outside shape of the injector preferably cylindrical or a constant area tube. However, for some applications the exit area of tube 14 may be smaller than the inlet area making the outside shape of the injector that of a frusto-conical body. It is to be noted also that the inlet area of the tube is intended to be fixed and no variable area mechanism is required. The injector just described is intended to be made as small as possible and yet provide the efficient mixing of supersonic streams over a short axial length and consequently a large number may be used in the inlet at a location as shown in FIGURE 1. Fuel supply line 20 and any supporting structure will naturally be made of a shock resistant, such as diamond-shaped, form in order to reduce shock effects caused by the supporting structure itself. Upon mixing in the injector, the fuel air mixture is expanded and further mixes with the rest of the air 12 in the combustor or diffuser as the case may be. It is to be noted that the combined momentum pressure loss due to the mixing process just described inside and beyond the injector of the instant type is about 40 to 50 percent smaller than that with a plain fuel injector without the venturi-like structure in combination with the remaining structure even when located at the same place and injecting fuel with the same pressure. Furthermore, the momentum pressure loss is rather indifferent to incomplete expansion of the fuel in the divergent spike opening 19 or of the fuel air mixture in the diverging portion 17 toward the exit of the injector. Thus, the injector is efficiently operable over a wide range of flight conditions.

An additional modification of a supersonic fuel injector is shown in FIGURE 3. In this figure like numerals refer to like parts and the operation is essentially the same as that described for FIGURE 2 with an additional feature added for further reducing the axial mixing length required. In this figure an additional duct 23 is open at both ends and extends centrally through the spike to provide a longitudinal passage through the spike. It terminates downstream substantially at the throat section 16 as does the spike opening 19. In this modification then, the fuel supply line 20 connects the interior of the spike between the duct 23 and the wall of the spike. A normal shock 24 will establish itself, by proper conventional shaping such as a convergence or suitable restriction in the form of an orfice, within duct 23. This is merely shown diagrammatically since suitable shaping of the duct will permit the establishment of normal shock 24 within the duct by known means. Thus, both spike 13 and the forward converging portion 15 of the venturi-like tube act as the inlet decelerating the air to a lower Mach number before mixing starts. The velocity of the air inside duct 23 because of shock 24 is subsonic and the static pressure of this air is consequently considerably higher than that of the rest of the air flowing through the injector. Since the air in duct 23 is at a higher level of static pressure than the gaseous fuel and the air in the annular chamber between the spike and the tube, this air will, at the end of duct 23 suddenly expand and exercise a force in a radial direction on the fuel which is now issuing from opening 19. The mixing due to the shearing forces between the two gas streams is thus assisted by the forces acting in a radial direction. Further, part of the air inside the injector is now inside the annular fuel stream from opening 19 providing for more contact surface between the fuel and the air. In both modifications, the result is the injection of the proper quantity of fuel to give a fuel-rich mixture that eventually mixes with the outside air producing a mixture proper for combustion.

The momentum pressure loss of an injector according to FIGURE 3 is slightly higher than that in FIGURE 2. In addition, the air expansion at the end of duct 23 induces a shock pattern which results in additional pressure losses. However, these losses are much smaller than the gain in momentum pressure recovery by surrounding the fuel nozzle or spike 13 with the venturi-like tube as described herein.

In order to obtain better mixing, but accompanied by some losses, it may be desirable to incorporate a mixing means on the spike opening 19. A typical mixing means 25 is shown on a partial diagram of the injector in FIGURE 4. Means 25 may be applied to either of the injectors of FIGURES 2 or 3. This may take a number of forms such as the simple corrugated form shown in FIGURE 4 or, as seen from the downstream end, as shown in FIGURE 5. Such a form merely increases the area contact betwen the fluids for better mixing and is illustrative of a typical structure that might be used. Other structures may be equally adaptable to the injector combination.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. A supersonic fuel injector for use in a supersonic airstream comprising, an upstream directed hollow spike, a tube surrounding said spike in concentric spaced relation and said tube converging from its forward end to form a throat and then diverging to its downstream end, said spike and tube forming an external compression supersonic annular inlet with no normal shock within said tube, a fuel supply line connected to the interior of said spike to supply fuel under pressure, said spike converging in the converging portion of the tube and terminating in a downstream directed opening substantially at the tube throat, means including said opening supplying fuel to the diverging portion of said tube.

2. Apparatus as described in claim 1 wherein said tube is cylindrical on its outside.

3. Apparatus as described in claim 1 having mixing means on the downstream open end of said spike.

4. Apparatus as described in claim 1 wherein said opening in the downstream end of said spike is converging-diverging.

5. A supersonic fuel injector for use in a supersonic airstream comprising, an upstream directed hollow spike, a tube surrounding said spike in concentric spaced relation and converging from its forward end to form a throat and then diverging to its downstream end, said spike and tube forming an external compression supersonic annular inlet with no normal shock within said tube, a duct extending centrally of said spike and open at both ends to provide a longitudinal passage through said spike, a fuel supply line connected to the interior of said spike between said spike and duct to supply fuel under pressure, said spike converging in the converging portion of said tube and terminating in a downstream directed opening around said duct disposed substantially at the throat of said venturi-like tube, means including said opening supplying fuel to the diverging portion of said tube.

6. Apparatus as described in claim 5 wherein said tube is cylindrical on its outside.

7. Apparatus as described in claim 5 having mixing means on the downstream open end of said spike.

8. Apparatus as described in claim 5 wherein said opening in the downstream end of said spike is converging-diverging.

References Cited in the file of this patent
UNITED STATES PATENTS

| | | |
|---|---|---|
| 2,679,137 | Probert | May 25, 1954 |
| 2,692,480 | Viaud | Oct. 26, 1954 |
| 2,729,059 | Foure | Jan. 3, 1956 |
| 2,840,990 | Longwell | July 1, 1958 |
| 2,867,977 | Buck | Jan. 13, 1959 |
| 3,042,344 | Etheridge | July 3, 1962 |
| 3,075,353 | Mullaney et al. | Jan. 29, 1963 |